United States Patent
Bugaj et al.

(10) Patent No.: US 9,663,867 B2
(45) Date of Patent: May 30, 2017

(54) PLATED INSTRUMENTATION PROBES AND SENSORS

(71) Applicant: United Technologies Corporation, Hartford, CT (US)

(72) Inventors: Shari L. Bugaj, Haddam, CT (US); Wendell V. Twelves, Jr., Glastonbury, CT (US); Grant O. Cook, III, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 244 days.

(21) Appl. No.: 14/331,771

(22) Filed: Jul. 15, 2014

(65) Prior Publication Data

US 2015/0013480 A1   Jan. 15, 2015

Related U.S. Application Data

(60) Provisional application No. 61/846,290, filed on Jul. 15, 2013.

(51) Int. Cl.
| | |
|---|---|
| *G01D 21/00* | (2006.01) |
| *C25D 5/48* | (2006.01) |
| *C25D 5/02* | (2006.01) |
| *C25D 7/00* | (2006.01) |
| *C23C 18/16* | (2006.01) |
| *G01D 5/20* | (2006.01) |
| *C25D 5/10* | (2006.01) |
| *C23C 18/30* | (2006.01) |

(52) U.S. Cl.
CPC ............ *C25D 5/48* (2013.01); *C23C 18/1605* (2013.01); *C23C 18/1608* (2013.01); *C23C 18/1653* (2013.01); *C25D 5/02* (2013.01); *C25D 7/00* (2013.01); *C23C 18/30* (2013.01); *C25D 5/022* (2013.01); *C25D 5/10* (2013.01); *G01D 5/2086* (2013.01)

(58) Field of Classification Search
CPC .................................................. C23C 18/1653
USPC ............... 73/866.5, 596–644, 649–661, 105; 324/207.11–209, 212–219, 228–243; 33/559–561; 356/614–624; 374/100–207
See application file for complete search history.

(56) References Cited

U.S. PATENT DOCUMENTS

| | | | |
|---|---|---|---|
| 2001/0017490 A1* | 8/2001 | Suzuki ................. | G11B 7/0932 310/12.08 |
| 2004/0134682 A1* | 7/2004 | En ....................... | C23C 18/1607 174/258 |
| 2004/0164606 A1 | 8/2004 | Chase | |
| 2014/0202170 A1 | 7/2014 | Cook, III | |

* cited by examiner

*Primary Examiner* — Walter L Lindsay, Jr.
*Assistant Examiner* — Ruth Labombard
(74) *Attorney, Agent, or Firm* — Kinney & Lange, P.A.

(57) ABSTRACT

A component comprises a non-metallic core having an outer surface, a first catalyst deposited onto at least a first portion of the outer surface of the non-metallic core, a second catalyst deposited onto at least a second portion of the outer surface of the non-metallic core, an electrical interface, and a metallic coating. The electrical interface is plated onto the first catalyst, and includes a first interface layer electroless plated onto the first catalyst. The metallic coating is plated onto the second catalyst.

20 Claims, 5 Drawing Sheets

PLATED INSTRUMENTATION PROBES AND SENSORS

CROSS-REFERENCE TO RELATED APPLICATION

Reference is made to Application Ser. No. 61/846,290 entitled "PLATED INSTRUMENTATION PROBES AND SENSORS" by Shari L. Bugaj et al., which is incorporated by reference.

BACKGROUND

The described subject matter relates generally to non-metallic components, and more particularly to non-metallic components with electrical interfaces and metallic coatings.

Electrical interfaces are used in a variety of applications. Typically, when used with polymeric components, the electrically conductive elements (e.g., leads, contacts, coils, etc.) are formed separately and later attached to the non-metallic component. For embedded interfaces (e.g., noncontact interfaces) the non-metallic component may be formed around the electrical interface. Alternatively, the non-metallic component is machined and the conductive element(s) is formed separately and inserted into the machined portion of the component. Limited types of metallic plating materials and processes suitable for non-metallic substrates have slowed widespread adoption of components with a metallic coating, which can provide strength, environmental resistance, etc. Previous plating processes and materials have also limited the ability to apply electrical interfaces simultaneously with the metallic coating(s).

SUMMARY

A component is disclosed which has a non-metallic core with an outer surface, a first catalyst deposited onto at least a first portion of the outer surface, a second catalyst deposited onto at least a second portion of the outer surface, an electrical interface, and a metallic coating. The electrical interface is plated onto the first catalyst, and includes a first interface layer electroless plated onto the first catalyst. The metallic coating is plated onto the second catalyst.

In another embodiment, a method is disclosed for forming a non-metallic component with a plated electrical interface. A non-metallic core having an outer surface is provided. A first catalyst is deposited onto a first portion of the outer surface, and an electrical interface is plated onto the first catalyst. A second catalyst is deposited onto a second portion of the outer surface, the second portion spaced apart from the first portion of the outer surface. A metallic coating is plated onto the second catalyst.

In a further embodiment, a sensor assembly has a non-metallic sensor core, an electrical interface plated onto a first catalyst, and a metallic coating plated onto a second catalyst. The non-metallic sensor core includes a trench defining a first portion of a core outer surface which is recessed below a second portion of the core outer surface. The first catalyst is deposited onto the first portion of the core outer surface, and the second catalyst is deposited onto the second portion of the core outer surface. The metallic coating includes a first metallic coating layer electroless plated onto the second catalyst, a second metallic coating layer electrolytically plated onto the first metallic coating layer, and a third metallic coating layer plated onto the second metallic coating layer.

A door assembly is disclosed in yet another embodiment, and includes a door hingeably secured to a frame. The frame includes a primary sensor portion, and the door includes a secondary sensor portion adapted to engage the primary sensor portion when the door is in a closed position relative to the frame. At least one of the primary sensor portion and the secondary sensor portion comprises a non-metallic sensor core having an outer surface, a first catalyst deposited onto a first portion of the outer surface, a second catalyst deposited onto a second portion of the outer surface, an electrical interface plated onto the first catalyst; and a metallic coating plated onto the second catalyst.

DETAILED DESCRIPTION

Figure 1A:
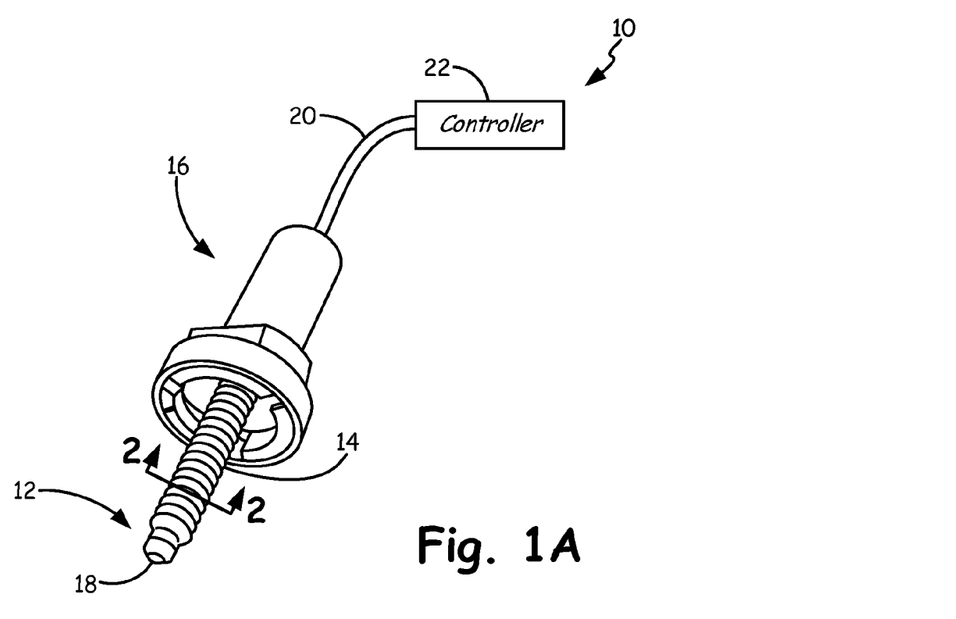
FIG. 1A depicts a sensor having a non-metallic substrate and a plated electrical interface.
Figure 1B:
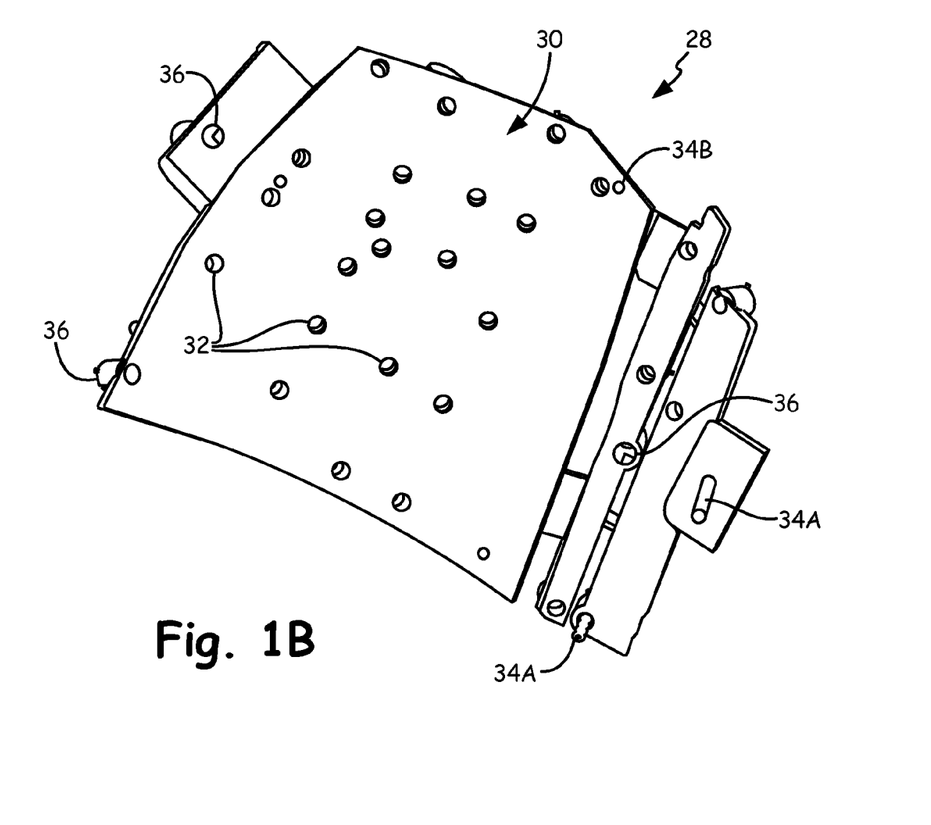
FIG. 1B shows an example airfoil template tool adapted to receive sensor such as is shown in FIG. 1A.

FIG. 1A shows an example sensor component 10. Generally, sensor component 10 includes body portion 12. One or more sensor elements (not shown) can be disposed on or in body portion 12 depending on the type of measurement or analysis being performed. Example sensor components 10 can be a contact sensor or a contactless sensor, and can include without limitation, a white light sensor, an ultrasonic sensor, a linear variable differential transformer (LVDT) sensor, a thermal acoustic sensor, and a coordinate measuring sensor. Contact sensors operate by contacting the surface being inspected, while non-contact sensors operate in proximity to the surface being inspected and can operate using electric, EMF, ultrasonic, or other signals received by the sensor. In one example, sensor 10 is an LVDT sensor in which sensor outer surface 14 contacts another surface (not shown) to determine its location relative to a fixed point. The fixed point may be defined for example using a template (such as is shown in FIG. 1B). Thus in certain embodiments, sensor component 10 can include coupling 16 surrounding sensor body 12 which engages a corresponding coupling on a template (also shown in FIG. 1B).

Instrumentation probes are utilized to locate and attach instrumentation needed to assess actual performance of an engine or device. Instrumentation probes are configured to fit into available space, should be physically attached in a stable, secure manner, and preferably can be fabricated within a relatively short leadtime to be available for the test. Other probes or sensors are used to assess the proper manufacture and/or installation of various components.

Depending on the type of unit, the operative portion of the sensor can be disposed in one or more parts of sensor body portion 12. For example, the operative portion can be incorporated into sensor body outer surface 14 and/or sensor base 18.

Sensor component 10 communicates signals from the operative portion via wired connection 20 to controller 22, which may convert, aggregate, and/or analyze the signals into usable readings. It will also be recognized that in an alternative embodiment, sensor 10 can communicate wirelessly with controller 22 via a variety of protocols, in which wired connection 20 is replaced by suitable receivers, transmitters, and/or wireless signals such as radio frequencies, as well as other short- or long-range wireless communication technology. Electrical interfaces for the operative sensor portion, as well as for wired and wireless connections, can be incorporated into sensor component 10, for example, by plating them onto a non-metallic sensor core. Plating of various electrical interfaces is shown in more detail in subsequent figures.

In this example, sensor component 10 is adapted to be inserted into template 28, shown in FIG. 1B. Template 28, which may be an airfoil tooling template, also includes template portion 30, ports 32, locators 34A, 34B, and sights 36.

Template 28 receives sensor component 10 through one or more ports 32 and can thus be used to determine if a surface of an airfoil or other structure (not shown) has the desired shape by measuring and comparing the actual locations of the surface to one or more nominal locations. This can be done through dielectric, mechanical, or inductive means depending on the type of sensor selected.

Sensor body 12 (shown in FIG. 1A) projects through one of a plurality of sensor ports or apertures 32. Sensor body 12 can be positioned using template 28 to be on or directly above a surface reference point. Example nominal, ideal, and actual characteristics of the surface include, without limitation, surface location (coordinates), thickness, and contour angle. Appropriate sensors are positioned as close as possible to each nominal location or reference point. It should be noted that sensor component 10 and template 28 are provided for exemplary purposes only, and the subject matter can be adapted to many other probes, sensors, and instrumentation.

Figure 2:
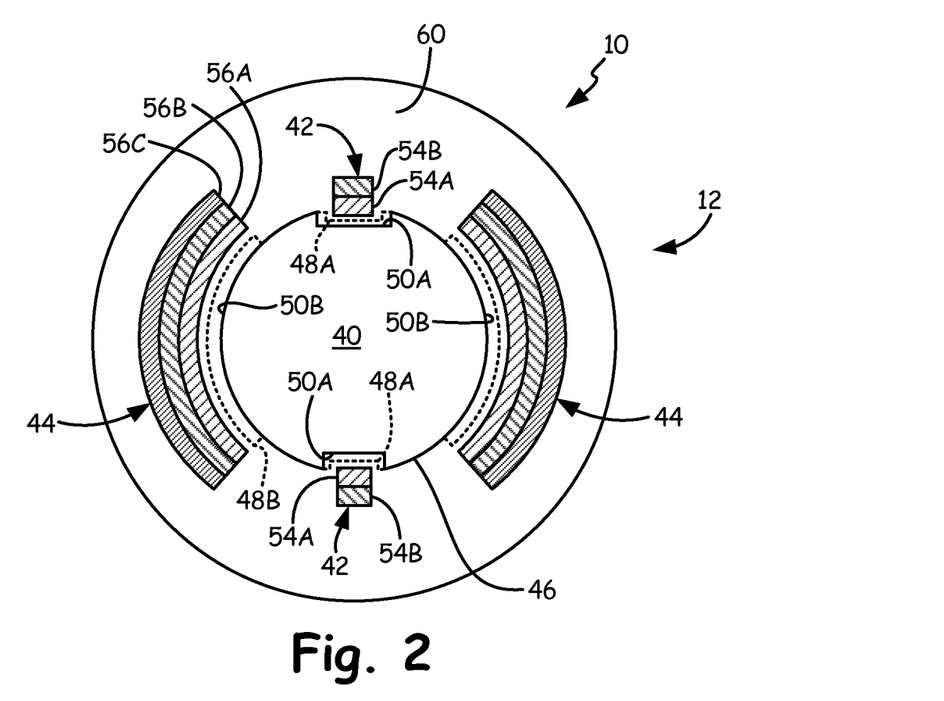
FIG. 2 is a sectional view taken across line 2-2 of the sensor shown in FIG. 1A.

FIG. 2 shows a sectional view of sensor component 10 taken across line 2-2 through sensor body 12 of FIG. 1A. As seen in FIG. 2, sensor component 10 includes non-metallic core 40, as well as plated electrical interface 42 and plated metallic coating 44. Non-metallic core 40 has outer surface 46, onto which first catalyst 48A is deposited. First catalyst 48A can be deposited onto at least first portion 50A of outer surface 46 in location(s) that will receive plated electrical interface 42.

Metallic coating 44 can also be plated onto at least second portion 50B of outer surface 46. This can be done by plating metallic coating 44 onto second catalyst 48B. First and second catalysts 48A, 48B can have similar or different compositions, depending on the other steps as explained below.

Each element of electrical interface 42 includes first interface layer 54A electroless plated onto the first catalyst. In certain embodiments, electrical interface 42 also includes second interface layer 54B electrolytically plated onto first interface layer 54A. Second interface layer 54B can have a higher electrical conductivity than an electrical conductivity of first interface layer 54A.

With respect to metallic coating 44, first coating layer 56A can be electroless plated onto second catalyst 48B, while second coating layer 56B can be electrolytically plated onto first coating layer 56A. In certain embodiments, second coating layer 56B can have a higher electrical conductivity than an electrical conductivity of first coating layer 56A. In these embodiments, metallic coating 44 can further include third coating layer 56C plated onto second coating layer 56B, the two of which may have different compositions. For example, second coating layer 56B can be more electrically conductive to facilitate deposition of third coating layer 56C, which may have more desirable mechanical properties to strengthen non-metallic substrate 40. Depending on the properties of second coating layer 56B and the material selected for third coating layer 56C, layer 56C can be deposited either by an electrolytic or electroless process.

Electrical interface 42 includes one or more electrical interface elements plated onto first catalyst 48A. Thus electrical interface 42 can define an electrically conductive portion of component 10 which is intended to receive, transmit, induce, or otherwise carry electrical current or signals during operation of the unit. Non-limiting examples include leads, contacts, inductive coils, dielectrically separated plates, etc.

Also shown in FIG. 2 is a noncontact portion of electrical interface 42 being covered by outer non-metallic layer 60. In the example shown in FIG. 2, interface layers 54A and 54B form leads running longitudinally along non-metallic core 40 through trenches (e.g. outer surface first portion 50A). Leads thus can provide electrical communication with controller 22 (shown in FIG. 1A).

Since the noncontact portion of electrical interface 42 is embedded within the recess or trench defining first outer surface portion 50A, this can simplify embedding of various elements of electrical interface 42 below core outer surface 46. This allows for the possibility of an overarching polymeric coating 60 covering some or all of component 10, including metallic coating 44. Thus electrical interface 42 is not limited to internal or recessed leads. Electrical interface 42 can additionally include an electrical contact in communication with the conductive lead. Additionally or alternatively, a noncontact portion of electrical interface 42 can include an inductive coil plated onto a portion 50A of core outer surface 46 (e.g., a wall of the trench).

Non-metallic core 40 is formed of a polymeric or composite material to reduce the overall mass of sensor component 10. In some embodiments, non-metallic core 40 is formed of a thermoplastic and/or thermoset material. Suitable thermoplastic and thermoset materials include, but are not limited to, polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), any of the foregoing with reinforcement (e.g., carbon or glass) and combinations thereof.

In some embodiments, non-metallic core 40 is formed by injection molding, resin transfer molding, vacuum-assisted resin transfer molding, composite layup (autoclave, compression, or liquid molding), compression molding, or additive manufacturing (liquid bed, powder bed, deposition processes). Alternatively, depending on its makeup, non-metallic core 40 can also be formed by extrusion, thermoforming, weaving (2D or 3D), braiding, vacuum forming, machining, or laminating. Non-metallic core 40 can be solid, as shown in FIG. 2, or non-metallic core 40 can contain one or more cavities to further reduce overall mass.

Metallic coating 44 can generally be formed from any metal having a melting temperature above about 150° C. (302° F.). Metallic coating 44 can include metals and/or alloys. In some embodiments, metallic coating 44 may consist of one or more metals selected from nickel, cobalt, copper, iron, gold, silver, palladium, rhodium, chromium, zinc, tin, cadmium, and alloys with any of the foregoing elements comprising at least 50 wt. % of the alloy, and combinations thereof. Metallic coating 44 generally has a local thickness between about 0.00254 mm (0.0001 inches) and about 0.762 mm (0.030 inches). In certain of these embodiments, metallic coating 44 has a thickness between about 0.0254 mm (0.001 inches) and about 0.508 mm (0.020 inches). In the embodiment shown in FIGS. 1A and 2, a substantial portion of sensor component 10 is covered by metallic coating 44, which may, in turn, be covered by outer polymeric layer 60. Polymeric layer 60 can be applied to produce a light-weight, stiff, and strong polymeric appearing and non-conductive component. These coatings can be applied by conventional processes, such as spray coating or dip coating, and can be applied to localized areas, if necessary.

Sensor component 10 is shown with a single non-metallic core 40 due to its relatively simple shape. However it will be appreciated that more complex shapes can be readily formed by joining a second non-metallic core (not shown) to the first non-metallic core. In such a case, metallic coating 44 also covers at least a portion of the outer surface of the second non-metallic core.

Plating of polymers and composites requires an activation process as these materials are not conductive. Once activated, the non-metallic substrate demonstrates the same propensity to nodulation and pitting, as experienced in traditional electrolytic plating processes. Nodulation is the excessive buildup of metallic coating 44 along high current density locations of a part. Corners and edges of a plated part tend to receive larger amounts of plating while recesses receive less. Pitting refers to the formation of holes in metallic coating 44 due to the presence of impurities in the plating bath, the entrapment of gas, etc. The thicker the plating, the more pronounced the nodulation and pitting problems become. These problems have discouraged others from attempting to manufacture plated polymer components for highly loaded applications.

Additionally, "racking" devices used to move parts in and out of plating baths and hold the part within the baths can also provide plating weak points. The racking device contacts at least a portion of the part to be plated to hold the part. Typically, little (or no) plating is received in the region where the racking device contacts the part, resulting in a plating layer that is significantly thinner (or non-existent) at the racking point than elsewhere on the part. Due to the thickness of the metallic coating applied to non-metallic core 40, different racking devices or racking points can be used for the metallic plating of a particular part. For example, sensor component 10 can be plated for a time with a first racking point at an upper side of sensor body 12 and a second racking point at a lower side. Alternatively, excess areas for racking points can be provided as part of metallic coating 44 or electrical interface 42 that are not necessary for structure or electrical transmittance, respectively. Shields, thieves, and masks can also be used during plating processes to modify the current field, and therefore the amount of plating that is deposited on certain geometric features. Shields force current to go around portions of the racking or the component (e.g., sensor) to be plated, slowing the rate of metal deposition on regions under the shields. Thieves are typically metal parts positioned around or near the component to be plated that "steal" away plating by serving as a high current density location and reducing the rate of metal deposition near the thief. Masks cover a portion of the component so that it does not receive any plating.

In some embodiments, weak plating areas of metallic coating 44 can be strengthened using transient liquid phase (TLP) bonding. TLP bonding of plated polymer components is discussed in more detail in commonly assigned, provisional U.S. patent application entitled "TRANSIENT LIQUID PHASE BONDING OF METAL-COVERED MATERIALS" Ser. No. 61/844,032 filed on Jul. 9, 2013. The strengthened bond provided by TLP bonding of metal plated components can eliminate weak points in metallic coating 44 that formed as a result of a nearby racking point, nodulation, or pitting while also allowing for flexibility in component design. One such design enhancement is bonding a metallic component to a plated non-metallic component.

Figure 3:
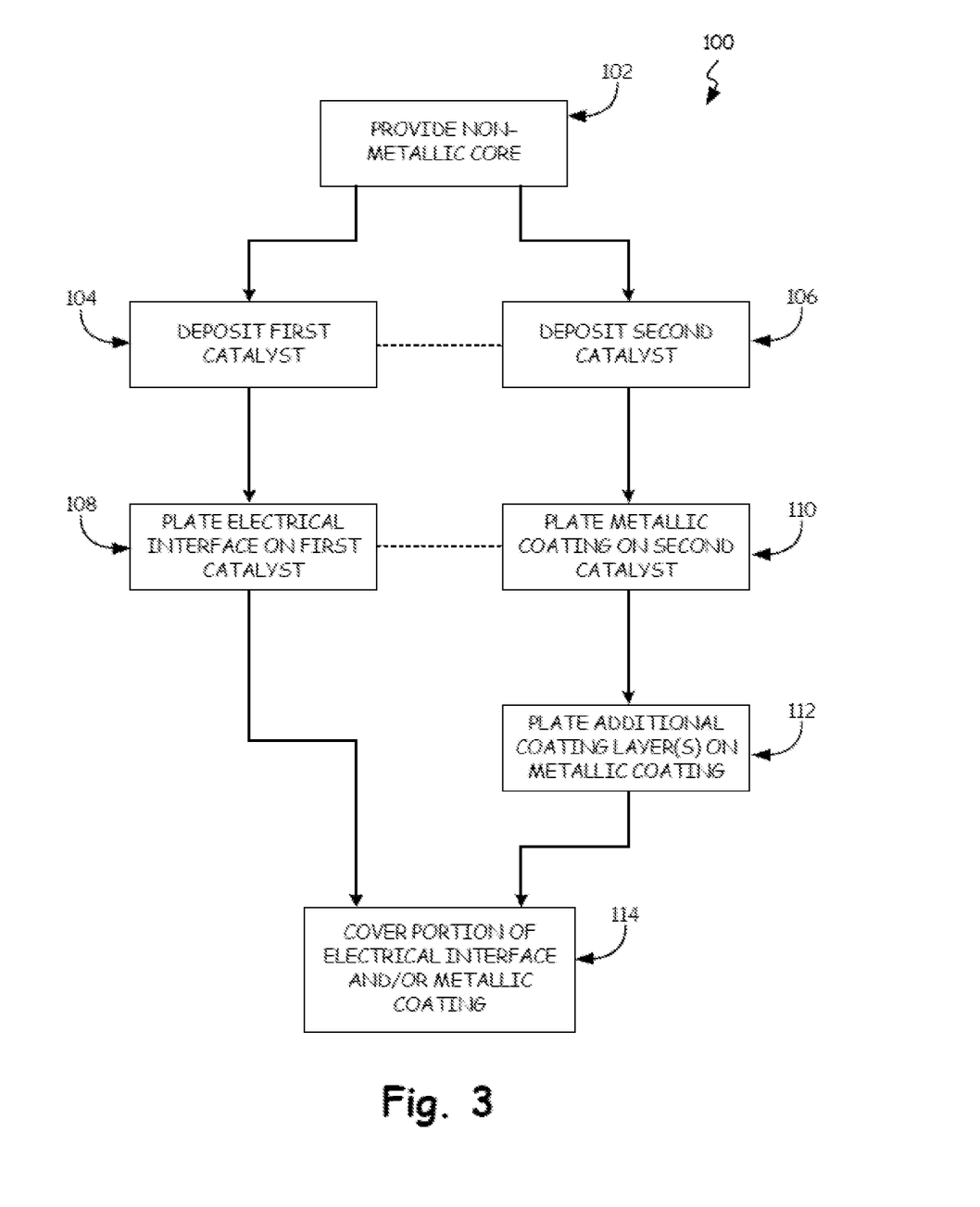
FIG. 3 shows a method for making components with a non-metallic substrate and a plated electrical interface.

Sensor component 10 is but one example of instrumentation which can be produced by a method shown in FIG. 3. Suitable instrumentation can include environmental sensors, probes, tooling, door sensors, and enclosures. Through the plating process, instrumentation can be incorporated during production of the larger aircraft component. This can reduce weight, cost, and lead-time particularly for one-off or small production runs. The parts can also incorporate instrumentation so as to reduce wiring and communication requirements in aircraft.

FIG. 3 shows steps of method 100 for forming a non-metallic component with a plated electrical interface. Method 100 begins with step 102 in which a non-metallic core is provided. The non-metallic core can be produced according to any of the methods described above, and subsequently provided to one or more plating processes. These can include injection molding, compression molding, blow molding, additive manufacturing (liquid bed, powder bed, deposition processes), or composite layup (autoclave, compression, or liquid molding). It will also be appreciated that more than one non-metallic core section can be combined into a larger non-metallic core. For example, polymer-based core sections can be joined by any conventional process (e.g., ultrasonic, laser, friction, friction-stir welding; traditional welding, adhesive; mitered joint with or without adhesive).

At step 104, a first catalyst is deposited onto a first portion of the outer surface. One or more portions of the outer surface, which are selected for plating, may be prepared to receive a catalyst by mechanical abrasion, chemical etching, reactive ion etching, ionic activation, and/or any other method known to those skilled in the art. A first catalyst may then be deposited on the prepared portion(s) of the non-metallic core outer surface.

At step 106, a second catalyst can be deposited onto a second portion of the outer surface. The second portion can be spaced apart from the first portion of the outer surface so as to minimize or prevent intermingling of the two areas to be plated in steps 108 and 110. The first and second catalysts can have a thickness on the atomic scale and can consist of palladium or another suitable catalyst material. Additionally or alternatively, masking material can be placed between the interfaces of the first and second catalysts to aid in accurate deposition of catalyst material to both portions of the outer surface.

Next, step 108 includes plating an electrical interface onto the first catalyst. The electrical interface can be any suitable conductive structure for generating, receiving, carrying, or inducing an electrical signal. Non-limiting examples include leads, contacts, inductive coils, dielectrically separated plates, etc.

In certain embodiments, step 108 of plating an electrical interface comprises multiple steps. In one example, a first interface layer is electroless (i.e., current-free) plated onto the first catalyst. Electroless plating allows the first interface layer to be deposited on nearly any accessible surface of the non-metallic core, even those difficult to reach using line-of-sight techniques. In certain of these embodiments, nickel is electroless plated onto the first catalyst according to any number of known techniques.

To improve electrical conductivity of the electrical interface, step 108 can also include electrolytically plating a second interface layer onto the first interface layer. The second interface layer can have a higher electrical conductivity than an electrical conductivity of the first interface layer. Examples of a suitable material for the second interface layer include copper and copper alloys. Alternatively, the second interface layer can include silver or conductive graphite.

After deposition of the second catalyst at step 106, step 110 can include plating a metallic coating onto the second catalyst. Similar to step 108, certain embodiments of step 110 can comprise multiple steps. Step 110 of plating a metallic coating can include electroless plating a first coating layer onto the second catalyst, and electrolytically plating a second coating layer onto the first coating layer. Also similar to step 108, the second coating layer can have a higher electrical conductivity than an electrical conductivity of the first coating layer. This conductivity can improve the application and adherence of an electrolytically plated third coating layer onto the second coating layer. Following electrolytic deposition of the second layer, the second layer may exhibit surface characteristics similar to a metallic (i.e., conductivity), thereby allowing the deposition of additional metallic platings thereon.

Accordingly, the third metallic coating layer may be then be deposited on the second coating layer by a metal deposition technique apparent to those having ordinary skill in the art including, but not limited to, electroplating, electroless plating, and electroforming. Any platable metallic material can be used, such as, but not limited to, nickel, cobalt, copper, iron, gold, silver, palladium, rhodium, chromium, zinc, tin, cadmium, and alloys with any of the foregoing elements comprising at least 50 wt. % of the alloy, or combinations thereof.

As indicated by the dashed lines between steps 104/106 and steps 108/110 in FIG. 3, certain embodiments of method 100 include the deposition steps and/or the plating steps being performed simultaneously. This is better illustrated by an example in which an embodiment of method 100 (shown in FIG. 3) is used to produce the portion of sensor 10 (shown in FIG. 2).

Method 100 begins with step 102 in which non-metallic core 40 is provided. This can be followed by simultaneous deposition of first catalyst 48A (step 104) and second catalyst 48B (step 106) onto respective first portion 50A and second portion 50B of outer surface 46. To facilitate simultaneous deposition of catalysts 48A, 48B, a third portion of outer surface 46 can be masked with any suitable material.

This can be followed by plating steps 108 and 110 in which electrical interface 42 is plated on first catalyst 48A and metallic coating 44 is plated on second catalyst 48B. Steps 108 and 110 can be performed simultaneously, at least in part, as is indicated by a dashed line in FIG. 3. In one example of this, first interface layer 54A is electroless plated onto first catalyst 48A, at the same time that at least a portion of first coating layer 56A is electroless plated onto second catalyst 48B. This can be followed by electrolytic plating of second coating layer 56B onto first coating layer 56A. In certain embodiments, second interface layer 54B can be electrolytically plated onto first interface layer 54A at the same time as electrolytic plating of second coating layer 56B. Optionally, at step 112, at least one additional coating layer (e.g., third coating layer 56C) can be plated on second coating layer 56B by an electrolytic or electroless process according to step 112. Additional coating layer(s) 56C can provide additional strength, structure, erosion resistance, etc. beyond that necessary for electrical interface 42.

Additional embodiments of the process illustrated in FIG. 3 are also possible and within the scope of this application. In certain alternative embodiments, steps 104 and 106 can be performed sequentially so as to apply the first and second catalysts in separate processes, after which steps 108 and 110 are followed to simultaneously plate the electrical interface and at least a portion of the metallic coating. In other alternative embodiments, steps 104 and 106 can be performed to simultaneously apply the first and second catalysts after which steps 108 and 110 are performed sequentially to plate the electrical interface 42 and the metallic coating 44 in separate processes.

Optional step 114 can be performed in which at least a portion of the electrical interface and/or the metallic coating is covered with an outer non-metallic layer to form a non-contact portion of the electrical interface. The non-contact portion of the electrical interface can be embedded within a recess formed into the non-metallic core, such as is shown with respect to FIG. 2. In other examples, shown below, the non-contact portion of the electrical interface can include a plated inductive coil or other similar structure recessed below a separate portion of the non-metallic core outer surface.

Polymeric coatings may also be applied to some or all of the metallic coating of plated polymeric components to produce a light-weight, stiff, and strong polymeric appearing (non-conductive) component. This polymeric coating may be applied by conventional processes such as, but not limited to, spray coating or dip coating and may be applied to all or portions of the component.

Formation of an electrical interface, including an optional integrated non-contact interface, can also be incorporated into steps of plating the body of the non-metallic substrate with a metallic coating. It should be noted that in certain embodiments, the steps for plating the interface and plating the metallic coating begin in a similar manner. Thus in embodiments with both a plated metallic coating and a plated electrical interface, after selectively forming thin first and second catalyst layers, an integrated three-step plating process can be performed.

In certain embodiments, the catalysts and some of the plating layers are applied as part of the same process, and can have similar or identical compositions. It is noted that, if desired, masking may be used during one or more of the metal deposition steps to designate certain outer surfaces of the non-metallic core for either the electrical interface or the metallic coating. Following is a non-limiting example of this embodiment.

A first catalyst (step 104) is deposited onto a first portion of the core outer surface, while a second catalyst (step 106) is deposited onto a second portion of the surface. A base metallic layer (e.g., electroless nickel) is plated on portions of both the first and second catalysts so that the base metallic layer (e.g., electroless nickel) respectively forms both the first interface layer (part of step 108) and the first coating layer (part of step 110). After electroless plating, a second coating layer is electrolytically plated on at least the first coating layer. The same material can also be applied to the first electrical interface layer, so long as the two portions are masked or otherwise separated. The second plating material is generally more conductive than the electroless plating, and thus allows for a third coating layer to complete the addition of the metallic coating onto the desired portions of the substrate body.

Plating internal channels, trenches, recesses, etc. to create portions of the electrical interface could be accomplished with potentially just the first plating step (e.g., electroless Ni) or the first two steps, ending with electrolytic Cu. This is faster and simpler than running two separate plating-on-polymer processes. In other words, plating of the electrical interface can potentially occur at the same time as the first steps of adding the metallic coating, so long as certain portions of the component are masked to ensure that the electrical interface is sufficiently insulated from the metallic coating.

FIGS. 4A-5B also illustrate additional examples of components with instrumentation and metallic coatings plated onto non-metallic cores.

Figure 4A:
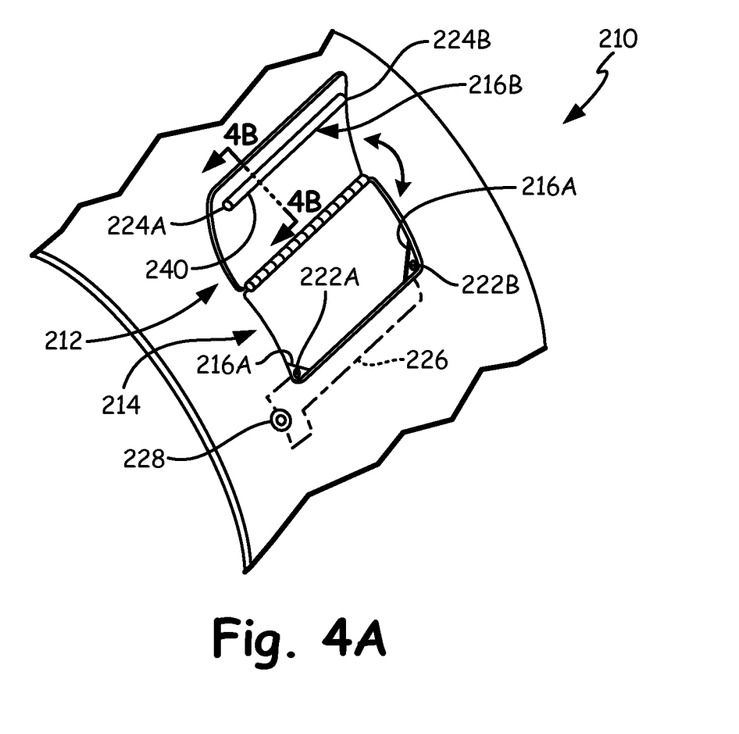
FIG. 4A depicts a door assembly, which includes an aircraft cargo access door and a plated polymer electrical interface strip.
Figure 4B:
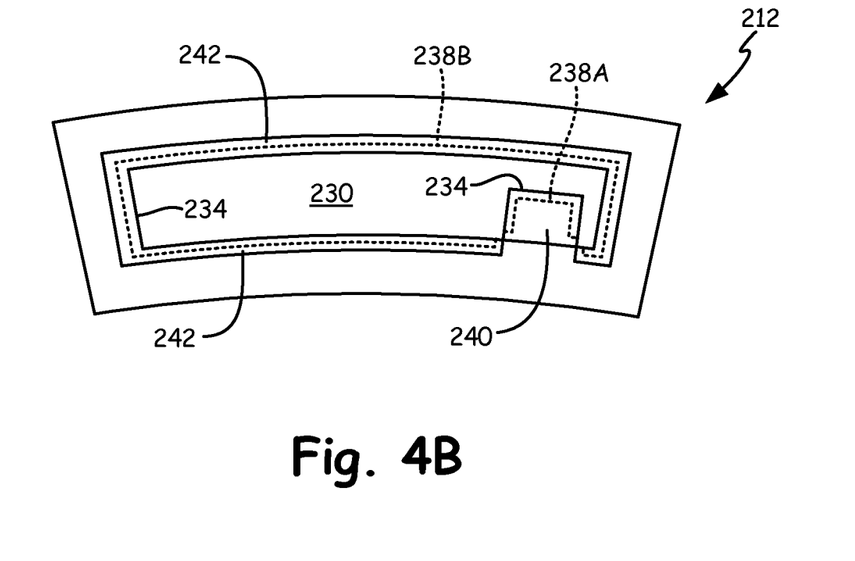
FIG. 4B shows a sectional view taken across line 4B-4B of the aircraft cargo access door and the plated polymer electrical interface strip.

FIG. 4A shows door assembly 210 with an integrated sensor. FIG. 4B is a sectional view of door 212 taken across line 4B-4B showing a plated electrical interface and metallic coating on the non-metallic core. Here, door assembly 210 includes door 212 and frame 214 secured thereto by hinges. Frame 214 has primary sensor portion 216A while door 212 has secondary sensor portion 216B. Primary and secondary sensor portions 216A, 216B are adapted to engage each other when door 212 is in a closed position relative to frame 214.

At least one of primary and secondary sensor portions 216A, 216B can include a non-metallic sensor core with an electrical interface plated onto at least a portion of the core outer surface. In the example of FIG. 4A, which is an aircraft cargo access door assembly, primary sensor portion 216A has exposed two contacts 222A, 222B on each corner of frame 214. Secondary sensor portion 216B is a plate fixed to a side of door 212 which faces primary contacts 222A, 222B. When door 212 is in a closed position, secondary contacts 224A, 224B on the contact plate engage primary contacts 222A, 222B, respectively, to close circuit 226 and change the status of indicator 228. Indicator 228 is shown as a lamp or LED in proximity to door 212; however it will be appreciated that indicator 228 can additionally or alternatively take the form of an electronic signal transmitted elsewhere into the aircraft such as the cockpit.

Similar to sensor component 10 (shown in FIGS. 1A and 2), FIG. 4B shows that door 212 can include non-metallic core 230. First catalyst 238A can be deposited onto a first portion of core outer surface 234, and second catalyst 238B deposited onto a second portion of core outer surface 234. An electrical interface (e.g., plate 240) can be plated onto first catalyst 238A along with secondary contacts 224A, 224B. To strengthen door 212, metallic coating 242 can be plated onto second catalyst 238B. This allows for reduced weight while providing necessary component strength. By forming plate 240 and parts of metallic coating 242 simultaneously, manufacturing expense and time can be reduced.

Figure 5A:
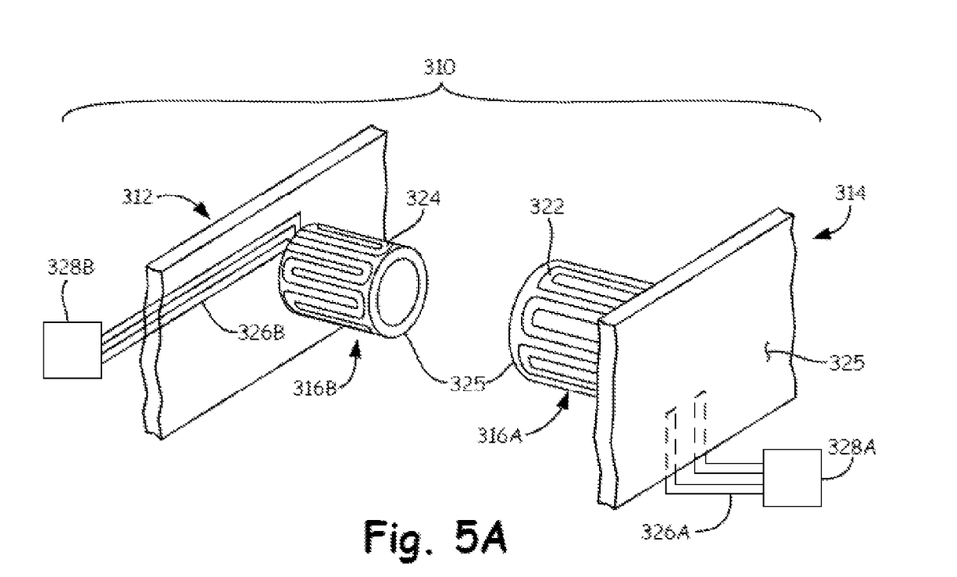
FIG. 5A is a perspective view of a portion of an aircraft passenger door assembly, including embedded closure sensor units, each with a non-metallic substrate and a plated noncontact electrical interface.
Figure 5B:
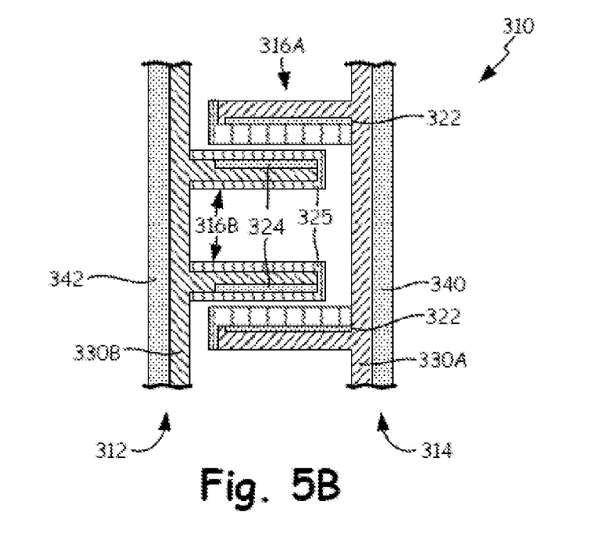
FIG. 5B is a side view of the aircraft passenger door assembly in FIG. 5A.

FIGS. 5A-5B show a more complex aircraft door assembly 310 which incorporates a plated electrical interface on both portions of the sensor, as well as a metallic coating on the non-metallic core forming the door.

Like the door assembly of FIGS. 4A and 4B, door assembly 310 includes door 312 hingeably secured to frame 314. Door 312 has a non-metallic core, an electrical interface, and a metallic coating. In this example, door assembly 310 is a passenger boarding door for an aircraft. While more complex than cargo door assembly 210, the larger size of passenger boarding door assembly 310 also offers potential for weight savings and reduction of wiring complexity when implementing a polymer plating process.

In the example of FIG. 5A, primary sensor portion 316A and secondary sensor portion 316B each have at least one respective embedded electrical interface 322, 324. Sensor portions 316A, 316B can be, for example, overlapping cylindrical projections which engage each other when door 312 is in a closed portion relative to frame 314. When door 312 is in a closed position (FIG. 5B), primary electrical interface 322 and secondary electrical interface 324 also engage. One or more surfaces of sensor portions 316A, 316B can be covered with an outer polymeric layer 325. Certain portions of outer polymeric layer 325 are omitted from FIG. 5A to better show electrical interfaces 322, 324.

Primary electrical interface 322 can be powered, for example via aircraft electrical system 328A by way of frame circuit 326A. When door 312 is closed, electrical interfaces 322, 324 are in sufficient proximity such that aircraft power in frame circuit 326A can cause an inductive current in secondary electrical interface 324. The induced secondary current travels through door circuit 326B, which indicates that door 312 is closed and changes the status of indicator 328B. Indicator 328B can be a local lamp or LED on or around door 312. In certain embodiments, the induced secondary current can, in turn, affect the primary current powering primary electrical interface 322. Changes in the primary current through frame circuit 326A can optionally be detected by aircraft electrical system 328A and indication may take the form of an electronic signal transmitted elsewhere into the aircraft, such as the cockpit.

One or both electrical interfaces 322, 324 can also be formed according to the plating process described above. For example, door 312 can include door non-metallic core 330B forming the majority of the door body, with secondary sensor portion 316B formed thereon. Frame 314, which can be secured to an aircraft frame (not shown) can include frame non-metallic core 330A forming a part of primary sensor portion 316A. One or both cores 330A, 330B can have an outer surface with a catalyst (not shown in FIG. 5A or 5B) deposited thereon.

In the example of FIG. 5B, a first catalyst can be deposited onto a first part of non-metallic core 330B such as secondary sensor portion 316B, while a second catalyst can be deposited onto a second (i.e. body) portion of core 330B. Secondary electrical interface 324 (i.e., an inductive coil) can then be plated onto the first catalyst (not shown in FIG. 5B). In certain embodiments, portions of one or both of primary electrical interface 322 and secondary electrical interface 324 can be noncontact interfaces (e.g., inductive coils) covered by a polymeric layer 325.

To strengthen the body of door 312, metallic coating 342 can also be plated onto the second catalyst. This allows for reduced weight from the use of non-metallic core 330B, while maintaining overall strength provided by the reinforcing metallic coating 342. A further polymeric layer 325 can also be placed over metallic coating 342 to provide a nonconductive outer layer and match the finish of interior aircraft components. By forming secondary electrical interface 324 and parts of metallic coating 342 simultaneously, manufacturing expense and time for door 312 can be reduced.

Similarly, first and second catalysts (not shown) can also be deposited onto different portions of frame non-metallic core 330A. In FIG. 5B, primary electrical interface 322 can be plated onto a first catalyst deposited on primary sensor portion 316A. Metallic frame coating 340 can also be plated onto a second catalyst deposited onto frame 314. Deposition of the first and second catalysts (not shown), and plating of primary electrical interface 322 and/or frame coating 340 can be performed according to any of the foregoing descriptions.

Discussion of Possible Embodiments

The following are non-exclusive descriptions of possible embodiments of the present description.

A component comprises a non-metallic core having an outer surface, a first catalyst deposited onto at least a first portion of the outer surface of the non-metallic core, a second catalyst deposited onto at least a second portion of the outer surface of the non-metallic core, an electrical interface, and a metallic coating. The electrical interface is plated onto the first catalyst, and includes a first interface layer electroless plated onto the first catalyst. The metallic coating is plated onto the second catalyst.

The component of the preceding paragraph can optionally include, additionally and/or alternatively, any one or more of the following features, configurations and/or additional components:

A component according to an exemplary embodiment of this disclosure, among other possible things includes a non-metallic core having an outer surface; a first catalyst deposited onto at least a first portion of the outer surface of the non-metallic core; a second catalyst deposited onto at least a second portion of the outer surface of the non-metallic core; an electrical interface plated onto the first catalyst, the electrical interface including a first interface layer electroless plated onto the first catalyst; and a metallic coating plated onto the second catalyst.

A further embodiment of the foregoing component, wherein the electrical interface also includes a second interface layer electrolytically plated onto the first interface layer, the second interface layer having a higher electrical conductivity than an electrical conductivity of the first interface layer.

A further embodiment of any of the foregoing components, wherein the electrical interface comprises a non-contact electrical interface covered by an outer non-metallic layer.

A further embodiment of any of the foregoing components, wherein the non-contact electrical interface is embedded within a recess formed into the non-metallic core.

A further embodiment of any of the foregoing components, wherein the non-contact electrical interface further comprises an inductive coil plated onto the first portion of the outer surface, the first portion recessed below a second portion of the outer surface.

A further embodiment of any of the foregoing components, wherein the electrical interface further comprises a conductive lead plated onto the first portion of the outer surface; and an electrical contact in communication with the conductive lead.

A further embodiment of any of the foregoing components, wherein at least a portion of the conductive lead is disposed in a trench formed in the non-metallic core.

A further embodiment of any of the foregoing components, wherein the metallic coating comprises a first coating layer electroless plated onto the first catalyst, and a second coating layer electrolytically plated onto the first coating layer.

A further embodiment of any of the foregoing components, wherein a third coating layer is plated onto the second coating layer, the third coating layer having a different composition than the second coating layer.

A further embodiment of any of the foregoing components, further comprising an outer polymeric layer covering at least a portion of the metallic coating.

A further embodiment of any of the foregoing components, further comprising a second non-metallic core joined to the first non-metallic core; wherein the metallic coating covers at least a portion of an outer surface of the second non-metallic core.

A method for forming a non-metallic component with a plated electrical interface includes providing a non-metallic core including an outer surface. A first catalyst is deposited onto a first portion of the outer surface. An electrical interface is plated onto the first catalyst. A second catalyst is deposited onto a second portion of the outer surface, the second portion spaced apart from the first portion of the outer surface. A metallic coating is plated onto the second catalyst.

The method of the preceding paragraph can optionally include, additionally and/or alternatively, any one or more of the following features, configurations and/or additional components:

A method according to an exemplary embodiment of this disclosure, among other possible things includes providing a non-metallic core including an outer surface; depositing a first catalyst onto a first portion of the outer surface; plating an electrical interface onto the first catalyst; depositing a second catalyst onto a second portion of the outer surface, the second portion spaced apart from the first portion of the outer surface; and plating a metallic coating onto the second catalyst.

A further embodiment of the foregoing method, wherein plating an electrical interface comprises electroless plating a first interface layer onto the first catalyst.

A further embodiment of any of the foregoing methods, wherein the step of plating an electrical interface further comprises electrolytically plating a second interface layer onto the first interface layer, the second interface layer having a higher electrical conductivity than an electrical conductivity of the first interface layer.

A further embodiment of any of the foregoing methods, further comprising: covering at least a portion of the electrical interface with an outer non-metallic layer to form a non-contact electrical interface.

A further embodiment of any of the foregoing methods, wherein the non-contact electrical interface is embedded within a recess formed into the non-metallic core.

A further embodiment of any of the foregoing methods, wherein the noncontact electrical interface further comprises a plated inductive coil recessed below a second portion of the non-metallic core outer surface.

A further embodiment of any of the foregoing methods, wherein the step of plating a metallic coating comprises: electroless plating a first coating layer onto the second catalyst; electrolytically plating a second coating layer onto the first coating layer, the second coating layer having a higher electrical conductivity than an electrical conductivity of the first coating layer; and plating a third coating layer onto the second coating layer.

A further embodiment of any of the foregoing methods, wherein the non-metallic core comprises a polymer selected from the group consisting of polyether ether ketones, polyphenylene sulfides, polyesters, polyamides, polyetherimides, thermoplastic polyimides, polyether ketone ketones, and polysulfones.

A further embodiment of any of the foregoing methods, wherein the non-metallic core comprises composite laminates.

A sensor assembly has a non-metallic sensor core, an electrical interface plated onto a first catalyst, and a metallic coating plated onto a second catalyst. The non-metallic sensor core includes a trench defining a first portion of a core outer surface which is recessed below a second portion of the core outer surface. The first catalyst is deposited onto the first portion of the core outer surface, and the second catalyst is deposited onto the second portion of the core outer surface. The metallic coating includes a first metallic coating layer electroless plated onto the second catalyst, a second metallic coating layer electrolytically plated onto the first metallic coating layer, and a third metallic coating layer plated onto the second metallic coating layer.

The sensor assembly of the preceding paragraph can optionally include, additionally and/or alternatively, any one or more of the following features, configurations and/or additional components:

A sensor assembly according to an exemplary embodiment of this disclosure, among other possible things includes a non-metallic sensor core including a trench defining a first portion of a core outer surface, the trench recessed below a second portion of the core outer surface; a first catalyst deposited onto the first portion of the core outer surface; an electrical interface plated onto the first catalyst; a second catalyst deposited onto the second portion of the core outer surface; and a metallic coating plated onto the second portion of the core outer surface, the metallic coating including a first metallic coating layer electroless plated onto the second catalyst, a second metallic coating layer electrolytically plated onto the first metallic coating layer, and a third metallic coating layer plated onto the second metallic coating layer.

A further embodiment of the foregoing sensor assembly wherein the electrical interface comprises a first interface layer electroless plated onto the first catalyst.

A further embodiment of any of the foregoing sensor assemblies, wherein the electrical interface further comprises a second interface layer electrolytically plated onto the first interface layer, the second interface layer having a higher electrical conductivity than an electrical conductivity of the first interface layer.

A further embodiment of any of the foregoing sensor assemblies, wherein the electrical interface comprises a non-contact electrical interface covered by an outer non-metallic layer.

A further embodiment of any of the foregoing sensor assemblies, wherein the non-contact electrical interface is embedded within the trench.

A further embodiment of any of the foregoing sensor assemblies, wherein the electrical interface further comprises a conductive lead plated onto a portion of the first non-metallic sensor core; and an electrical contact in communication with the conductive lead, the electrical contact extending through to the outer surface.

A further embodiment of any of the foregoing sensor assemblies, further comprising an outer polymeric layer covering at least a portion of the metallic coating.

A further embodiment of any of the foregoing sensor assemblies, wherein the non-metallic sensor core comprises a polymer selected from the group consisting of polyether ether ketones, polyphenylene sulfides, polyesters, polyamides, polyetherimides, thermoplastic polyimides, polyether ketone ketones, and polysulfones.

A further embodiment of any of the foregoing sensor assemblies, wherein the non-metallic sensor core comprises composite laminates.

A door assembly includes a door hingeably secured to a frame. The frame includes a primary sensor portion, and the door includes a secondary sensor portion adapted to engage the primary sensor portion when the door is in a closed position relative to the frame. At least one of the primary sensor portion and the secondary sensor portion comprises a non-metallic sensor core having an outer surface, a first catalyst deposited onto a first portion of the outer surface, a second catalyst deposited onto a second portion of the outer surface, an electrical interface plated onto the first catalyst; and a metallic coating plated onto the second catalyst.

The door assembly of the preceding paragraph can optionally include, additionally and/or alternatively, any one or more of the following features, configurations and/or additional components:

A door assembly according to an exemplary embodiment of this disclosure, among other possible things includes a frame including a primary sensor portion; a door hingeably secured to the frame, the door including a secondary sensor portion adapted to engage the primary sensor portion when the door is in a closed position relative to the frame; wherein at least one of the primary sensor portion and the secondary sensor portion comprises: a non-metallic sensor core having an outer surface; a first catalyst deposited onto a first portion of the outer surface; a second catalyst deposited onto a second portion of the outer surface; an electrical interface plated onto the first catalyst; and a metallic coating plated onto the second catalyst.

A further embodiment of the foregoing door assembly, wherein the primary sensor portion includes a primary transformer coil.

A further embodiment of any of the foregoing sensor assemblies, wherein the secondary sensor portion includes a secondary transformer coil.

A further embodiment of any of the foregoing sensor assemblies, wherein at least one of the primary sensor portion and the secondary sensor portion is embedded into a recess formed in the non-metallic sensor core.

Although the present invention has been described with reference to preferred embodiments, workers skilled in the art will recognize that changes may be made in form and detail without departing from the spirit and scope of the invention.

The invention claimed is:
1. A door assembly comprising:
a door hingeably secured to a frame, at least one of the door and the frame including a non-metallic core; and
an integrated sensor assembly comprising:
a primary sensor portion disposed on the frame or the door; and a secondary sensor portion disposed on the other of the frame and the door, the primary and secondary sensor portions adapted to engage each other when the door is in a closed position relative to the frame;
wherein one of the primary sensor portion and the secondary sensor portion incorporates a first plated electrical interface including at least a first catalyst deposited onto a first portion of an outer surface of a non-metallic core, a second catalyst deposited onto a second portion of the outer surface of the non-metallic core, an electrical interface plated onto the first catalyst, and a metallic coating plated onto the second catalyst, the electrical interface including a first interface layer electroless plated onto the first catalyst and a second interface layer electrolytically plated onto the first interface layer.

2. The door assembly of claim 1, wherein the other of the primary sensor portion and the secondary sensor portion includes at least one exposed electrical contact such that engagement of the primary sensor portion and the secondary sensor portion close an electrical circuit indicating the door is in a closed position relative to the frame.

3. The door assembly of claim 1, wherein the door assembly is an aircraft cargo access door assembly.

4. The door assembly of claim 3, wherein the primary sensor portion is disposed on the frame, and the secondary sensor portion is disposed on the door.

5. The door assembly of claim 4, wherein the primary sensor portion has at least two exposed primary contacts at corners of the frame.

6. The door assembly of claim 4, wherein the secondary sensor portion includes a plate fixed to a side of the door which faces the exposed primary contacts at the corners of the frame.

7. The door assembly of claim 1, wherein the other of the primary sensor portion and the secondary sensor portion incorporates a second plated electrical interface.

8. The door assembly of claim 7, wherein the primary sensor portion and the secondary sensor portion include one or more surfaces of sensor portions covered with a corresponding outer polymeric layer.

9. The door assembly of claim 8, wherein the first and second plated electrical interfaces are embedded in a recess of the non-metallic core, below the corresponding outer polymeric layer, such that both the primary sensor portion and the secondary sensor portion each have at least one respective embedded electrical interface.

10. The door assembly of claim 7, wherein the door assembly is a passenger boarding door assembly for an aircraft.

11. The door assembly of claim 10, wherein the first or second plated electrical interface is powered via an aircraft electrical system by way of at least one frame circuit.

12. The door assembly of claim 11, wherein the first and second plated electrical interfaces, when the door is in a closed position, are in sufficient proximity such that aircraft power in the frame circuit causes an inductive current in the second plated electrical interface, such that induced secondary current travels through a door circuit.

13. The door assembly of claim 12, wherein the induced secondary current, in turn, changes the primary current through the frame circuit powering the first plated electrical interface, causing an indication in the aircraft electrical system.

14. The door assembly of claim 12, wherein the door circuit is only inductively coupled to the aircraft electrical system.

15. The door assembly of claim 7, wherein the primary sensor portion is disposed on a first cylindrical projection and the secondary sensor portion is disposed on a first cylindrical projection, the first and second cylindrical projections overlapping and engage each other when the door is in a closed portion relative to the frame, such that the first and second primary electrical interfaces also engage.

16. A method for integrating an electrical sensor interface into a first door assembly component including a first non-metallic core, the method comprising:
depositing a first sensor portion on the first non-metallic core, the first non-metallic core forming a majority of a door body or a frame body; and
wherein depositing the first sensor portion comprises:
depositing a first catalyst onto a first portion of an outer surface of the first non-metallic core;
depositing a second catalyst onto a second portion of the outer surface of the non-metallic core;
electroless plating a first interface layer onto the first catalyst;
electrolytically plating a second interface layer onto the first interface layer to form a first electrical interface, the second interface layer having a higher electrical conductivity than an electrical conductivity of the first interface layer; and
plating a metallic coating onto the second catalyst.

17. The method of claim 16, further comprising:
covering at least a portion of the first electrical interface with an outer non-metallic layer to form the first electrical interface as a non-contact electrical interface.

18. The method of claim 17, wherein the first electrical interface includes an inductive coil in a recessed portion of the non-metallic core.

19. The method of claim 16, further comprising:
depositing a second sensor portion on a second non-metallic core of the door assembly, the first and second sensor portions adapted to engage each other when the door assembly is in a closed position.

20. The method of claim 16, wherein the first non-metallic core comprises a polymer selected from the group consisting of polyether ether ketones, polyphenylene sulfides, polyesters, polyamides, polyetherimides, thermoplastic polyimides, polyether ketone ketones, and polysulfones.

* * * * *